(12) United States Patent
Yang

(10) Patent No.: US 8,929,819 B2
(45) Date of Patent: Jan. 6, 2015

(54) METHOD AND DEVICE FOR SEARCHING FOR NEIGHBORING BLUETOOTH DEVICES

(75) Inventor: Hui Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/577,286

(22) PCT Filed: Jun. 8, 2011

(86) PCT No.: PCT/CN2011/075455
§ 371 (c)(1),
(2), (4) Date: Aug. 6, 2012

(87) PCT Pub. No.: WO2012/119356
PCT Pub. Date: Sep. 13, 2012

(65) Prior Publication Data
US 2013/0343431 A1    Dec. 26, 2013

(30) Foreign Application Priority Data
Mar. 10, 2011    (CN) .......................... 2011 1 0057678

(51) Int. Cl.
| | |
|---|---|
| H04B 7/00 | (2006.01) |
| H04B 1/7156 | (2011.01) |
| H04W 8/00 | (2009.01) |
| H04M 1/725 | (2006.01) |
| H04W 84/18 | (2009.01) |

(52) U.S. Cl.
CPC ............ *H04B 1/7156* (2013.01); *H04W 8/005* (2013.01); *H04M 1/7253* (2013.01); *H04W 84/18* (2013.01)
USPC ...................................................... 455/41.2

(58) Field of Classification Search
USPC ................................................ 455/41.1–41.3
See application file for complete search history.

(56) References Cited

U.S. PATENT DOCUMENTS

| | | | |
|---|---|---|---|
| 6,754,469 B1 | 6/2004 | Lee et al. | |
| 7,174,131 B2 * | 2/2007 | Lee et al. | 455/41.2 |
| 8,126,399 B1 * | 2/2012 | Lee | 455/41.2 |
| 2007/0105500 A1 * | 5/2007 | Kim | 455/41.2 |
| 2007/0297440 A1 * | 12/2007 | Moon | 370/458 |

FOREIGN PATENT DOCUMENTS

| | | |
|---|---|---|
| CN | 1302123 | 7/2001 |
| CN | 101170769 | 4/2008 |
| KR | 20020032082 | 5/2002 |

* cited by examiner

*Primary Examiner* — Nguyen Vo
(74) *Attorney, Agent, or Firm* — Brooks Kushman P.C.

(57) ABSTRACT

A method and apparatus are disclosed for searching for a neighboring bluetooth device. The method includes: when searching out a neighboring bluetooth device, a bluetooth device initiating a searching operation judging whether the neighboring bluetooth device is a recorded bluetooth device in a bluetooth management database; if no, sending a name request command to the neighboring bluetooth device, and acquiring a name of the neighboring bluetooth device; or else, judging whether the name of the neighboring bluetooth device has ever been changed by a user according to a name management field carried in a Frequency Hop Synchronization (FHS) group of the neighboring bluetooth device; if the name has not ever been changed, acquiring a stored name of the neighboring bluetooth device from the bluetooth management database; if changed, sending the name request command to the neighboring bluetooth device, and acquiring the name of the neighboring bluetooth device.

8 Claims, 1 Drawing Sheet

METHOD AND DEVICE FOR SEARCHING FOR NEIGHBORING BLUETOOTH DEVICES

CROSS-REFERENCE TO RELATED APPLICATION

This application is the U.S. national phase of PCT Appln. No. PCT/CN2011/075455 filed Jun. 8, 2011 which claims priority to Chinese Application No. 201110057678.X filed Mar. 10, 2011, the disclosures of which are incorporated in their entirety by reference herein.

TECHNICAL FIELD

The present invention relates to the field of bluetooth communication technology, and particularly, to a method and device for searching for neighboring bluetooth devices.

BACKGROUND OF THE RELATED ART

Currently, Bluetooth has been widely used in portable terminal devices for its unique excellent features. A terminal device with a bluetooth module (called as a bluetooth device for short) searches for a neighboring bluetooth device to implement matching and connection with the neighboring bluetooth device, thereby implementing wireless communication with the searched out Bluetooth device.

In the related art, the process of searching for a neighboring bluetooth device includes: acquiring an address and name of a neighboring bluetooth device, wherein the name of the bluetooth device can be changed by a user using the device. Generally, after the address of the neighboring bluetooth device is acquired, the bluetooth device will send a name request signal to the neighboring bluetooth device, hereafter, the bluetooth device will wait for 0.625 milliseconds to 50.9 seconds (5.12 seconds in general) in order to receive the name of the bluetooth device from the neighboring bluetooth device. Therefore, if the above two operations are executed every time when searching the neighboring bluetooth device, a serious delay may occur in the process of searching for and matching with the bluetooth device.

In order to solve the problem, in the related art, when a neighboring bluetooth device which has ever been searched for is searched for again, the name acquisition operation will not be executed, but the name of the bluetooth device stored in a bluetooth management database when the bluetooth device was searched out last time is used. However, since the name of the neighboring bluetooth device can be changed, if the name of the neighboring bluetooth device is changed, it is impossible to connect to an expected bluetooth device accurately.

The above existing method for searching for and matching with bluetooth devices can not solve the problem of long searching and matching time caused by the existed long name acquisition time in the process of searching for and matching with the bluetooth device. In addition, since the device name can be changed anytime, if the user changes the name of the bluetooth device during the interval of two searching times, the name of the latest bluetooth device cannot be acquired using this method, thereby causing that the matching and connection with the searched out neighboring bluetooth device cannot be implemented accurately. Therefore, the problems such as of long searching and matching delay, slow matching and connecting speed and low matching and connecting accuracy so as to lead to the matching success rate being low etc. exist in the existing implementation process of searching for and matching with the bluetooth device.

SUMMARY OF THE INVENTION

The example of the present invention provides a method and apparatus for searching for a neighboring bluetooth device, to solve the problem that slow matching and connecting speed, long delay and low matching and connecting success rate exist in the existing searching and matching process of bluetooth device.

A method for searching a neighboring bluetooth device, comprising:

when searching out a neighboring bluetooth device, a bluetooth device initiating the searching operation judging whether the neighboring bluetooth device is a bluetooth device recorded in a bluetooth management database;

if no, sending a name request command to the neighboring bluetooth device, and acquiring a name of the neighboring bluetooth device; and if yes, according to a name management field carried in a Frequency Hop Synchronization (FHS) group of the neighboring bluetooth device, judging whether the name of the neighboring bluetooth device has ever been changed by a user; if the name has not ever been changed, acquiring a stored name of the neighboring bluetooth device from the bluetooth management database; and if the name has ever been changed, sending the name request command to the neighboring bluetooth device, and acquiring the name of the neighboring bluetooth device.

An apparatus for searching for a neighboring bluetooth device, comprising: a communication module, a storage module and a control module;

the communication module is used to: initiate an operation of searching for a neighboring bluetooth device, and send a name request command to the searched out neighboring bluetooth device according to a command of the control module;

the storage module is used to: store a bluetooth management database;

the control module is used to: when a bluetooth device initiating a searching operation searches out the neighboring bluetooth device, judge whether the neighboring bluetooth device is a recorded bluetooth device in the bluetooth management database; if no, instruct the communication module to send the name request command to the neighboring bluetooth device, and acquire a name of the neighboring bluetooth device; if yes, according to a name management field carried in a Frequency Hop Synchronization (FHS) group of the neighboring bluetooth device, judge whether the name of the neighboring bluetooth device has ever been changed by a user; if the name has not ever been changed, acquire the name of the neighboring bluetooth device stored in the bluetooth management database; and if the name has ever been changed, instruct the communication module to send the name request command to the neighboring bluetooth device, and acquire the name of the neighboring bluetooth device.

Beneficial effects of the present invention are described as follows:

with the method and apparatus for searching a neighboring bluetooth device provided by the examples of the present invention, whether a name of the bluetooth device has ever been changed by the user is identified by setting the name management field, thus names can be acquired only with respect to the bluetooth device of which the name has ever been changed by the user and the newly searched out bluetooth device, while with regard to the originally recorded bluetooth device of which the name has not ever been changed, the name thereof will not be acquired again, which can not only avoid that the name of the recorded bluetooth device is acquired repeatedly, but also acquire the name of the device changed by the user timely and accurately. When the delay caused by the name acquisition is tried to be avoided and the speed of searching and matching is increased, the accuracy of searching for and matching with the bluetooth device is also improved simultaneously.

BRIEF DESCRIPTION OF DRAWINGS

The accompanying drawings to be described here are used to provide a further understanding of the present invention and constitute a part of the present invention. The exemplary embodiments and illustrations thereof of the present invention are used to explain the present invention, but do not constitute an inappropriate limitation on the present invention. In the drawings.

PREFERRED EMBODIMENTS OF THE PRESENT INVENTION

In order to make the technical problem to be solved, the technical scheme and beneficial effects of the present invention more clear and understandable, the present invention will be further described in detail in combination with the accompanying drawings and examples below. It should be understood that, the specific examples described here are only used to explain the present invention, which is not used to limit the present invention.

Figure 1:
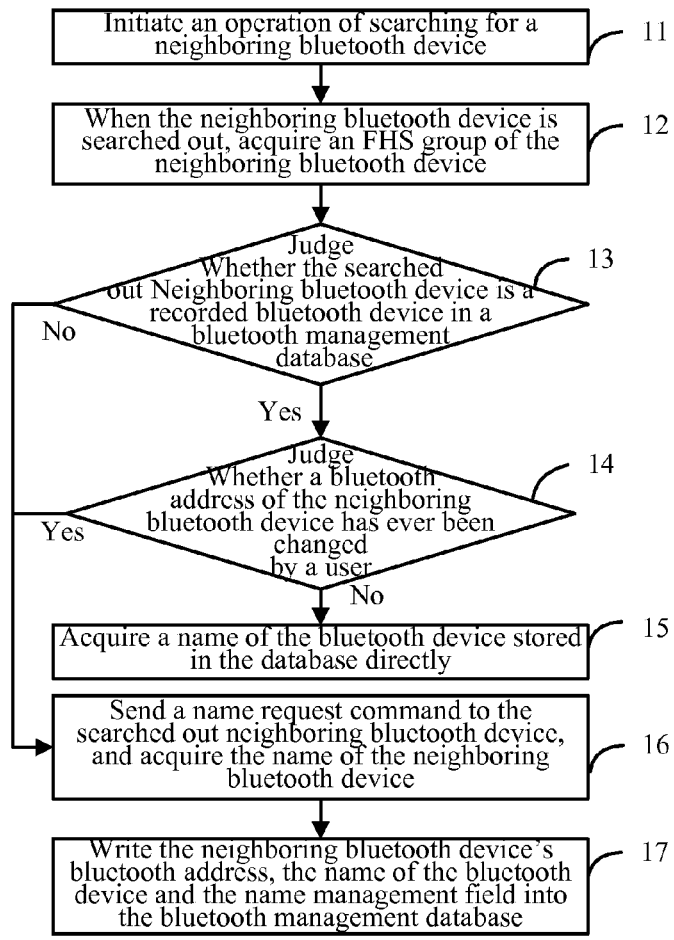
FIG. 1 is a flow chart of the method for searching neighboring bluetooth devices in the example of the present invention.

The flow chart of the method for searching neighboring bluetooth devices provided by the example of the present invention is as shown in FIG. 1, which comprises the following steps.

In step 11, an operation of searching a neighboring bluetooth device is initiated.

A user initiates the operation of searching the neighboring bluetooth device through a used bluetooth device.

The user determines whether to search the neighboring bluetooth device according to a prompt of the used bluetooth device, the searching operation can be confirmed and executed by selecting "yes", or it can return from the current operation of determining whether to search the neighboring bluetooth device by selecting "no".

In step 12, when the neighboring bluetooth device is searched, a Frequency Hop Synchronization (FHS) group of the neighboring bluetooth device is acquired.

The user can cancel or stop the searching anytime according to the searching situation. For example, the user can click "cancel" to cancel the current on-going searching when considering that the searching is not required to be continued any more; or it can be configured that the on-going searching is stopped automatically when enough bluetooth devices are searched out or the number of the searched out bluetooth devices exceeds a set threshold. When the user does not give a command for canceling the searching or the searching is not stopped according to user settings, the operation of searching the neighboring bluetooth device will be continued.

When a bluetooth device initiating the searching operation searches out the neighboring bluetooth device, the neighboring bluetooth device will make a response, and the response is generally made by the FHS group containing several kinds of information such as a bluetooth address and so on. Therefore, when the neighboring bluetooth device is searched out, the information of the FHS group of the neighboring bluetooth device can be acquired. In the present invention, a name management field is added in the FHS group and used to identify whether a name of the bluetooth device has ever been changed by the user. Hence, the FHS group includes at least the bluetooth address and the name management field of the neighboring bluetooth device in the present invention.

Preferably, formats of the FHS group of the bluetooth device in the present invention can be as shown in table 1 below.

TABLE 1

| The number of Bits | Description |
| --- | --- |
| 34 Bits | parity bit |
| 24 Bit | LAP |
| 2 Bit | undefined |
| 2 Bit | SR |
| 2 Bit | SP |
| 6 Bit | UAP |
| 16 Bit | NAP |
| 1 Bit | Name management |
| 24 Bit | Device class |
| 3 Bit | AM_ADDR |
| 26 Bit | CLK |
| 3 Bit | Call scanning mode |

In table 1, it is the usage situation of each bit from the Least Significant Bit (LSB) to the Most Significant Bit (MSB) from top to bottom, wherein Bit is a bit unit. For example, as shown in table 1, the length of the name management field can be set as 1 bit or other lengths as needed.

In table 1, LAP means Lower Address Part and indicates a bluetooth lower address part for sending the bluetooth device; SR means Scan Repetition; SP means Scan Period; UAP means Upper Address Part and indicates a bluetooth upper address part for sending the bluetooth device; NAP means Non-significant Address Part and indicates a bluetooth non-significant address part for sending the bluetooth device; AM_ADDR means a bluetooth member address; and CLK means a local clock.

After the names of the bluetooth device and neighboring bluetooth device are changed, name management fields in the FHS group are randomly revised to values which are different from the name management fields before the names are changed, or the name management fields are revised using a mode of performing modulo 2 arithmetic on the name management fields before the names are changed.

For example, the name management field can be randomly assigned as 0 or 1 during the initialization, if the user changes the name of the bluetooth device, a value of the name management field is read, and after the modulo 2 arithmetic is performed, the calculated value is written into the name, management field.

In step 13, whether the searched out neighboring bluetooth device is a bluetooth device ever recorded in a bluetooth management database is judged.

When the neighboring bluetooth device is searched out, an address of the neighboring bluetooth device is acquired firstly, and judging whether a bluetooth address in the FHS group of the neighboring bluetooth device is a stored bluetooth address in the database to determine whether the searched out neighboring bluetooth device is the recorded bluetooth device in the bluetooth management database.

The acquired bluetooth address of the neighboring bluetooth device and the stored bluetooth address in the bluetooth management database are compared, so as to determine whether the acquired bluetooth address of the neighboring bluetooth device is in the bluetooth management database. If yes, it is determined that the searched out neighboring bluetooth device is the recorded bluetooth device in the bluetooth management database, or else, it is determined that the searched out neighboring bluetooth device is not the recorded bluetooth device in the bluetooth management database.

If yes, step 14 is executed, or else, step 16 is executed.

In step 14, whether the bluetooth address of the neighboring bluetooth device has ever been changed by the user is judged. If yes, step 16 is executed, or else, step 15 is executed.

When the neighboring bluetooth device is searched out, whether the name of the neighboring bluetooth device has ever been changed by the user is determined according to the acquired name management field carried in the FHS group.

The name management field in the FHS group of the neighboring bluetooth device and the name management field of the neighboring bluetooth device stored in the bluetooth management database are compared, if the two are identical, it is determined that the name of the neighboring bluetooth device has not ever been changed by the user, and if the two are not identical, it is determined that the name of the neighboring bluetooth device has ever been changed by the user.

That is, if the name management field in the FHS group of the neighboring bluetooth device is identical to the name management field of the neighboring bluetooth device stored in the bluetooth management database, it is indicated that the name of the neighboring bluetooth device has not ever been changed, and a name request command is not required to be sent in subsequent processing; and if the two are not identical, it is indicated that the name of the neighboring bluetooth device has ever been changed, and the name request command is required to be sent in the subsequent processing, so as to acquire a new name of the bluetooth device and perform a timely update.

In step 15, the name of the bluetooth device stored in the database is acquired directly. The flow ends.

When the stored name of the neighboring bluetooth device is acquired from the bluetooth management database, the name of the neighboring bluetooth device stored in the bluetooth management database can be used directly, and it is not necessary to request for acquiring the name again, thereby saving the time for acquiring the name of the bluetooth device and reducing the delay of searching and matching for the bluetooth device.

In step 16, the name request command is sent to the searched out neighboring bluetooth device, and the name of the neighboring bluetooth device is acquired.

When the searched out bluetooth device determined in step 13 is not the recorded bluetooth device in the bluetooth management database, since there is no related record about the name of the bluetooth device in the bluetooth management database, the user needs to initiate a name acquisition flow through the used bluetooth device, so as to acquire the name of the searched neighboring bluetooth device.

When the bluetooth address of the searched out neighboring bluetooth device is determined in step 14 to be changed by the user, since the name of the device is not identical to the related record in the bluetooth management database, the user needs to initiate the name acquisition flow through the used bluetooth device, so as to acquire the name of the searched out neighboring bluetooth device and perform the update. Thus the problem of matching failure caused by an untimely update on the name of the bluetooth device is avoided.

In step 17, the bluetooth address of the neighboring bluetooth device, the name and the name management field of the bluetooth device are written into the bluetooth management database.

At the point, other information in the FHS group of the neighboring bluetooth device also can be written into the bluetooth management database together.

Figure 2:
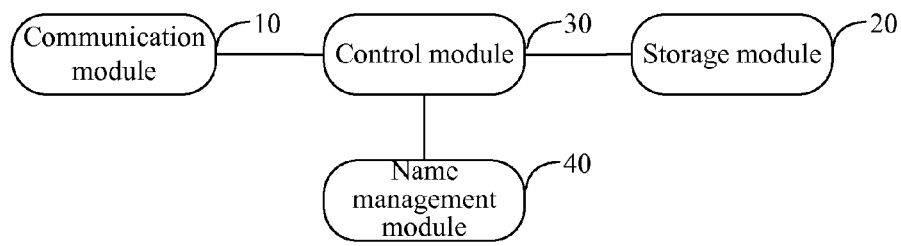
FIG. 2 is a schematic diagram of the structure of the apparatus for searching neighboring bluetooth devices in the example of the present invention.

In combination with the method for searching neighboring bluetooth devices provided by the example of the present invention, the example of the present invention also provides a device for searching neighboring bluetooth devices. The structure of the device is as shown in FIG. 2 and includes: a communication module 10, a storage module 20 and a control module 30, wherein:

the communication module 10 is used to implement a communication between bluetooth devices, and specifically, to initiate an operation of searching a neighboring bluetooth device, and send a name request command to the searched out neighboring bluetooth device according to a instruction of the control module 30.

The storage module 20 is used to store a bluetooth management database.

The control module 30 is used to: when a bluetooth device initiating a searching operation searches out the neighboring bluetooth device, judge whether the neighboring bluetooth device is a recorded bluetooth device in the bluetooth management database; if no, instruct the communication module 10 to send the name request command to the neighboring bluetooth device, and acquire a name of the neighboring bluetooth device; if yes, according to a name management field carried in a Frequency Hop Synchronization (FHS) group of the neighboring bluetooth device, judge whether the name of the neighboring bluetooth device has ever been changed by a user; if the name has never been changed, acquire the stored name of the neighboring bluetooth device from the bluetooth management database; and if the name has ever been changed, instruct the communication module 10 to send the name request command to the neighboring bluetooth device, and acquire the name of the neighboring bluetooth device.

Preferably, the control module 30 is specifically used to: judge whether a bluetooth address of the searched out neighboring bluetooth device is a stored bluetooth address in the bluetooth management database; if yes, determine that the searched out neighboring bluetooth device is the bluetooth device ever recorded in the bluetooth management database; or else, determine that the searched out neighboring bluetooth device is not the recorded bluetooth device in the bluetooth management database.

Preferably, the control module 30 is specifically used to: compare the name management field in the FHS group of the neighboring bluetooth device with the name management field of the neighboring bluetooth device stored in the bluetooth management database, if the two are identical, determine that the name of the neighboring bluetooth device has not ever been changed by the user, and if the two are not identical, determining that the name of the neighboring bluetooth device has ever been changed by the user.

Preferably, the control module 30 is further used to: after acquiring the name of the neighboring bluetooth device, write the bluetooth address of the neighboring bluetooth device, the name and the name management field of the bluetooth device into the bluetooth management database.

Preferably, the device for searching neighboring bluetooth devices in the present invention further comprises: a name management module 40, used to: manage the name management field, after the name of the bluetooth device is changed, randomly revise the name management field in the FHS group to a value which is different from the name management field before the name is changed, or revise the name management field using a mode of performing modulo 2 arithmetic on the name management field before the name is changed.

That is to say, in the above method provided by the example of the present invention, when the searched out neighboring bluetooth device is not the recorded bluetooth device in the bluetooth management database, or, the searched out neighboring bluetooth device is the recorded bluetooth device in the bluetooth management database, but the name of the neighboring bluetooth device has been changed, thus the name request command is sent to the neighboring bluetooth device to acquire the name of the neighboring bluetooth device. If the searched neighboring bluetooth device is the recorded bluetooth device in the bluetooth management database and the name of the neighboring bluetooth device has not ever been changed by the user, the stored name of the neighboring bluetooth device is acquired from the bluetooth management database. Thus names thereof may be acquired only for the bluetooth device of which the name has ever been changed by the user and the newly searched out bluetooth device, and with regard to the originally recorded bluetooth device of which the name has not ever been changed, the name thereof will not be acquired again, which can not only avoid that the name of the recorded bluetooth device is acquired repeatedly, but also acquire the name of the device changed by the user timely and accurately. When the delay caused by the name acquisition is tried to be avoided and the speed of searching and matching is increased, the accuracy of searching for and matching with the bluetooth device is also improved simultaneously.

In the method, by setting the name management field, identifying whether the name of the bluetooth device has ever been changed by the user can be implemented, the implementation is simple and convenient without making much improvements on the existing bluetooth device, and much more cost inputs are not required.

The above description shows and describes one preferred example of the present invention, and as mention before, it should be understood that, the present invention is not limited to the forms disclosed in the present invention, and should not be viewed as an exclusion to other examples, but can be applied to various other combinations, modifications and environments, and can make alterations through the above instruction or the technology and knowledge in the related art within the scope of inventive concept of the present invention. The alterations and changes made by the skilled in the art without departing from the spirit and scope of the present invention should all fall into the protection scope of the appended claims of the present invention.

What is claimed is:

1. A method for searching a neighboring bluetooth device, comprising:
   when a bluetooth device initiating a searching operation searches out a neighboring bluetooth device, the bluetooth device receives a Frequency Hop Synchronization (FHS) group of the neighboring bluetooth device, wherein the FHS group contains a name management field for identifying whether the name of the neighboring bluetooth device has ever been changed by a user; and
   if judging the neighboring bluetooth device is a bluetooth device recorded in a bluetooth management database by bluetooth address of the neighboring bluetooth device, judging whether the name of the neighboring bluetooth device has ever been changed by a user according to the name management field carried in the FHS group of the neighboring bluetooth device; if the name of the neighboring bluetooth device has ever been changed, sending a name request command to the neighboring bluetooth device, and acquiring the name of the neighboring bluetooth device;
   wherein, after the name of the neighboring bluetooth device is changed, randomly revising the name management field in the FHS group to a value different from the name management field before the name is changed, or revising the name management field using a mode of performing modulo 2 arithmetic on the name management field before the name is changed.

2. The method according to claim 1, wherein, judging whether the neighboring bluetooth device is the bluetooth device recorded in thebluetooth management database specifically comprises:
   judging whether a bluetooth address of the searched out neighboring bluetooth device is a stored bluetooth address in the bluetooth management database;
   if yes, determining that the searched out neighboring bluetooth device is the recorded bluetooth device in the bluetooth management database, or else, determining that the searched out neighboring bluetooth device is not the recorded bluetooth device in the bluetooth management database.

3. The method according to claim 1, wherein, according to the name management field carried in the Frequency Hop Synchronization (FHS) group of the neighboring bluetooth-device, judging whether the name of the neighboring bluetooth device has ever been changed by the user specifically comprises:
   comparing the name management field in the FHS group with the name management field of the neighboring bluetooth device stored in the bluetooth management database, if identical, determining that the name of the neighboring bluetooth device has not ever been changed by the user, or else, determining that the name of the neighboring bluetooth device has everbeen changed by the user.

4. The method according to claim 1, after acquiring the name of the neighboring bluetooth device, further comprising:
   writing the neighboring bluetooth device'sbluetooth address, the name of the bluetooth device and the name management field into the bluetooth management database.

5. An apparatus for searching for a neighboring bluetooth device, comprising: a communication module, a storage module and a control module;
   the communication module is used to:initiate an operation of searching for a neighboring bluetooth device, and send a name request command to the searched out neighboring bluetooth device according to a command of the control module;
   the storage module is used to: store a bluetooth management database;
   the control module is used to: when initiating the operation of searching for the neighboring bluetooth device, receive a Frequency Hop Synchronization (FHS) group of the neighboring bluetooth device, wherein the FHS group contains a name management field for identifying whether the name of the neighboring bluetooth device has ever been changed by a user; and if judge the neighboring bluetooth device is a recorded bluetooth device in the bluetooth management database by bluetooth address of the neighboring bluetooth device, judge whether the name of the neighboring bluetooth device has ever been changed by a user according to the name management field carried in the FHS group of the neighboring bluetooth device; if the name of the neighboring bluetooth device has ever been changed, instruct the communication module to send the name request command to the neighboring bluetooth device, and acquire the name of the neighboring bluetooth device; and the apparatus further comprising a name management module, configured to:

after the name of the bluetooth device is changed, randomly revise the name management field in the FHS group to a value different from the name management field before the name is changed, or revise the name management field using a mode of performing modulo 2 arithmetic on the name management field before the name is changed.

6. The apparatus according to claim 5, wherein, the control module is specifically used to:

judge whether a bluetooth address of the searched out neighboring bluetooth device is a bluetooth address stored in the bluetooth management database; when yes, determine that the searched out neighboring bluetooth device is the bluetooth device recorded in the bluetooth management database; or else, determine that the searched out neighboring bluetooth device is not the bluetooth device recordedin the bluetooth management database.

7. The apparatus according to claim 5, wherein, the control module is specifically used to:

compare the name management field in the FHS group with the name management field of the neighboring bluetooth device stored in the bluetooth management database, if identical, determining that the name of the neighboring bluetooth device has not ever changed by the user, or else, determining that the name of the neighboring bluetooth device has ever been changed by the user.

8. The apparatus according to claim 5, wherein, the control module is further used to:

after acquiring the name of the neighboring bluetooth device, write the neighboring bluetooth device's bluetooth address, the name of the bluetooth device and the name management field into the bluetooth management database.

* * * * *